United States Patent Office 3,489,731
Patented Jan. 13, 1970

3,489,731
METHOD OF POLYMERIZATION AND COPOLYMERIZATION OF INTERNAL N-OLEFINS WITH THEIR ISOMERIZATION TO CORRESPONDING TERMINAL N-OLEFINS
Riichiro Imoto and Akihiko Shimizu, Yamaguchi-ken, and Takyuki Otsu and Minoru Imoto, Osaka-fu, Japan, assignors to Toyo Soda Manufacturing Co., Ltd., Yamaguchi-ken, Japan
No Drawing. Filed July 1, 1966, Ser. No. 262,111
Claims priority, application Japan, July 7, 1965, 40/40,700
Int. Cl. C08f 1/34, 1/36, 3/02
U.S. Cl. 260—80.78                                                11 Claims

ABSTRACT OF THE DISCLOSURE

Process for producing terminal polyolefins by polymerizing and copolymerizing internal n-olefins by using a ternary catalyst system consisting of (a) a strong reducing agent selected from the organo-metallic compounds of Group III, (b) a compound selected from the transition metal compounds of Groups IV–V and (c) a compound selected from the transition metal compounds of Group VIII with their isomerization to the corresponding terminal n-olefins. The present disclosure also provides for a composition consisting of the above-mentioned catalyst system.

---

This invention relates to a new process for polymerizing and copolymerizing internal n-olefins by using ternary catalyst systems consisting of organo-metallic compounds of Groups III, transition metal compounds of Groups IV–V, and transition metal compounds of Groups VIII with their isomerization to terminal n-olefins to produce a corresponding terminal polyolefins.

The internal n-olefins, because of steric hindrance of their substituents, generally do not homo-polymerize by the methods so far have been known, and it has been regarded as impossible to make them into high-molecular-weight polymers.

The problem of how to achieve high polymerization reactions of these monomers, therefore, has been one of the important tasks confronting the high polymer industry. Three possible methods for obtaining high polymers of internal n-olefins may be considered, (1) to copolymerize with monomers having the least steric hindrance of the substituent, (2) to polymerize under a super high pressure in order to reduce substituent steric hindrance, and (3) to polymerize with their isomerization to terminal n-olefins having less steric hindrance than themselves.

With regards the method (1), which has been in use for a long time, it involves a technical barrier making it impossible to contain more than 50% of the internal n-olefins into polymers besides its inherent disadvantage in that it requires other sources of monomers, while the method (2) also involves technical difficulties as it requires a super high pressure over 10,000 kg./cm.³. As to the method (3) there has not been any attempt so far except one in the United States, which was recently patented U.S. Patent 2,956,989, Oct. 18, 1960. In this process, however, a complex catalyst composed of metallic sub-halides, aluminum halides and alkaline metallic halides are used, and is substantially different from the catalyst of this invention.

Although it has been known that the internal n-olefins cannot be polymerized by use of the already known coordinated anionic catalysts, a certain kind of these catalysts has been found by the authors of this invention to produce, though at a rather slow pace, high polymers at a relatively high temperature. The polymers so obtained was found by their X-ray diffraction and infrared spectrum analysis to be corresponding terminal polyolefins. But the rate of isomerization and polymerization of the internal n-olefins attained by use of the already known anionic catalyst is so low that it is difficult to use it on industrial base.

The distinctive feature of this invention, as shall be described in more detail hereinafter, is to carry out polymerization of internal n-olefins readily by using a complex catalyst consisting ternary catalyst systems of organo-metallic compounds of Groups III, transition metal compounds of Groups IV–V and transition metal compounds of Groups VIII, and carrying out polymerization reactions with their isomerization to corresponding terminal n-olefins to produce high polymers having virtually the same physical and chemical properties as those obtainable by polymerization of the terminal n-olefins by use of the already known coordinated anionic catalysts.

The catalyst used in this invention is a complex catalyst consisting ternary catalyst systems of organo-metallic compounds of Groups III, transition metal compounds of Groups IV–V and transition metal compounds of Groups VIII, and the lack of any one of these component systems renders it ineffective as the isomerizing and polymerizing catalyst. For instance, any one of these catalysts components when used independently or a catalysts system consisting a combination of any two of the components will be ineffective on industrial scale as shown in the comparative examples hereinafter.

But as to each of the catalyst component systems one or more than two kinds may be used without harm.

For organo-metallic compounds of Groups III, $AlR_3$ (R is alkyl groups) is suitable, but $AlR_2X$ and $AlRX_2$ (X is halogen) are not effective. For $AlR_3$, triethyl aluminum, and triisobutyl aluminum etc. are generally used, while for transition metal compounds of Groups IV–V, titanium and vanadium compounds are suitable and the lower the atomic valence the better, while titanium (IV) and vanadium (IV) compounds are virtually ineffective. As typical compounds $TiX_3$, or $VX_3$ (X is halogen or alcoxy groups, alkyl groups) is used. The amount of $TiX_3$ or/and $VX_3$ to be used is in the range below the equivalent to that of $AlR_3$. For transition metal compounds of Groups VIII, the use of compounds of Fe, Co, Ni, Rh, Pd, Ir and Pt may be possible, but a compound of Fe and Ni is preferable and here again the lower the atomic valence the more effective. For the compounds of Fe and Ni, halides compounds, i.e., $FeCl_2$, $FeCl_3$, $NiCl_2$ or acetylacetonates, i.e., Fe(II)acetylacetonate, Fe(III)acetylacetonate, and Ni(II)acetylacetonate, may be used, but in case of Ni compound, nickel dimethyl glyoxime is also effective. These metallic compounds of Groups VIII are generally used in molar ratio of 0.1–2.0 of metal compound of Groups VIII against Ti and/or V compounds. These three components of the catalyst are generally mixed in hydrocarbon which is inert to polymerization reactions, for example, such as ligroin, hexane or heptane. The catalyst, in this case, may be left standing for about one hour for aging in room temperature or temperatures exceeding that. The concentration of the catalyst is or in the range of 5–100 mmole/l. by $TiX_3$ and/or $VX_3$ conversion.

The internal n-olefins used in this invention include the normal (straight chained) olefins containing 4 to 8 carbon atoms such as n-butene-2, n-penetene-2, n-hexene-2, n-heptene-3 etc., and internal isoolefins and cyclic internal olefins are not included as they do not polymerize by the catalyst of this invention. But these latter olefins or α-olefins may be contained in the raw material as impurities without adverse effects. Of the internal n-olefins, too, those whose thermodynamic equilibrium value (80° C.) is below 0.5 molar percent cannot be polymerized by the catalyst system of this invention, and, therefore, are excluded from the scope of this invention. The internal n-olefins are usually used in the concentration of about 1–10 mol/l., and polymerization is carried out at polymerization temperatures of 40–120° C. for the duration of 5–30 hours under atmosphere or pressures exceeding that, and after the polymerization is completed, polymerized mixture is refined by the known process, i.e., the mixture is thrown into hydrochloric acid-methanol mixed solution to deactivate the catalyst and the polymer is separated, at the same time, by precipitation and is filtered, then the polymers are refined by reprecipitation with toluene-methanol method.

The following comparative and operational examples illustrate the process of this invention. The comparative examples are Examples 1–3, whereas the operational examples are Examples 4–33.

EXAMPLE 1

300 ml. of heptane, 6.3 g. of titanium trichloride and 82 ml. of triethyl aluminum-heptane mixed solution, which had been prepared beforehand ($10^{-3}$ mole/ml. The solution used in the examples hereinafter given is of this concentration throughout) were mixed in nitrogen streams and left standing at room temperature for one hour for aging. 440 ml. of trans-butene (purity 99.9%) was then charged into this catalyst system and the reaction was carried out at a temperature of 60° C. for 12 hours. The polymer obtained was 2.8 g. (yield 1%).

EXAMPLE 2

440 ml. of heptane, 4.8 g. of vanadium trichloride, and 56 ml. of triethyl aluminum mixed solution prepared as in Example 1 were mixed and aged at room temperature for one hour. 330 ml. of trans-butene-2 was then charged into this system and the reaction was carried out at a temperature of 80° C. for 28 hours, but no polymers were obtained.

EXAMPLE 3

300 ml. of heptane, 6.5 g. of ferric acetylacetonate and 81 ml. of triethyl aluminum mixed solution were mixed, and aged at room temperature for one hour. 430 ml. of trans-butene-2 was then charged into this system and the reaction was carried out at a temperature of 80° C. for 28 hours. No polymers were obtainable.

EXAMPLE 4

130 ml. of heptane, 3.2 g. of titanium trichloride, 1.7 g. of nickel chloride and 57 ml. of triethyl aluminum mixed solution were mixed and aged at room temperature for one hour. 220 ml. of trans-butene-2 was then charged into this system and the reaction was carried out at a temperature of 80° C. for 28 hours. The polymer obtained was 74.3 g. (yield 53.2%). Ether-insoluble parts were 52.5%. The intrinsic viscosity of the ether-insoluble determined in tetraline at a temperature of 135° C. was 1.02. ($[\eta]$ Shown in the example following was determined under these same conditions.) The resulting polymer was found by infrared spectrum and X-ray diffraction analysis to be poly-butene-1.

EXAMPLE 5

Ferric chloride used instead of nickel chloride and reactions were carried out under the identical conditions as in Example 4. The polymer yield was 26.1 g. (or yield 18%). $[\eta]=0.85$.

EXAMPLE 6

The process of Example 4 was repeated using cobalt-(11) chloride. The polymer yield was 25.2 g. (yield 18%).

EXAMPLE 17

300 ml. of heptane, 7.1 g. of titanium trichloride, 7.0 g. of ferric acetylacetonate and 127 ml. of triethyl aluminum mixed solution were mixed and aged at room temperature for one hour. 490 ml. of transbutene-2 was then charged into this system and the reaction was carried out at a temperature of 80° C. for 26 hours. The polymer obtained was 302 g. (yield 97%). Ether-insoluble parts were 79.5%. $[\eta]=1.17$.

EXAMPLE 8

Polymerization of cis-butene-2 (purity 99.9%) was conducted under the identical conditions as in Example 7. The polymer obtained was 310 g. (yield 100%). Ether-insoluble parts were 89.5%. $[\eta]=1.26$.

EXAMPLE 9

310 ml. of heptane, 7.2 g. of titanium trichloride, 5.2 g. of nickel dimethyl glyoxime and 129 ml. of triethyl aluminum mixed solution were mixed and aged at room temperature for one hour. 490 ml. of transbutene-2 was then charged into this mixture and the reaction was carried out at 80° C. for 15 hours. The polymer obtained was 257 g. (yield 82.5%). Ether-insoluble parts were 66.2%. $[\eta]=1.13$.

EXAMPLE 10

Polymerization of cis-butene-2 was carried out under the identical conditions as in Example 9. The polymer obtained was 268 g. (yield 86%). Ether-insoluble parts were 72.5%. $[\eta]=1.25$.

EXAMPLE 11

230 ml. of heptane, 4.5 g. of titanium trichloride, 3.2 g. of nickel dimethyl glyoxime and 81 ml. of triethyl aluminum mixed solution were mixed and aged at room temperature for one hour. 300 ml. of butene mixture consisting of 31.1% of butene-1 and 68.9% of cis-butene-2 was then charged into this system and the reaction was carried out at a temperature of 80° C. for 8 hours. The polymer obtained was 182 g. (yield 94.1%). Ether-insoluble parts were 70.8%. $[\eta]=1.52$. The resulting polymer was confirmed to be polybutene-1 by X-ray diffraction and infrared spectrum analysis.

EXAMPLE 12

The process described in Example 11 was repeated using a butene mixture consisting of 4.4% of butene-1, 24.2% of cis-butene-2 and 72.6% of transbutene-2. The polymer obtained was 91.7 g. (yield 48%). Ether-insoluble parts were 66.8%. $[\eta]=1.17$.

EXAMPLE 13

The process of Example 7 was repeated using 360 ml. of pentene-2 (0.7% of pentene-1, 62.5% of cis-pentene-2 and 36.8% of trans-pentene-2). The polymer obtained was 87.5 g. (yield 37.4%). Ether-insoluble parts were nil.

EXAMPLE 14

410 ml. of heptane, 6.8 g. of vanadium trichloride, 4.8 g. of nickel dimethyl glyoxime and 130 ml. of triethyl aluminum mixed solution were mixed and aged at room temperature for one hour. 380 ml. of pentene-2 was then charged into this system and the reaction was carried out at a temperature of 80° C. for 28 hours. The polymer obtained was 100 g. (yield 40.5%). Ether-insoluble parts were nil.

EXAMPLE 15

160 ml. of heptane, 4.6 g. of vanadium trichloride, 5.1 g. of ferric acetylacetonate and 87 ml. of triethyl aluminum mixed solution were mixed and aged at room temperature for one hour. 150 ml. of transbutene-2 and 180 ml. of pentene-2 were then charged into this system and the reaction was carried out at a temperature of 80° C. for 28 hours. The polymer obtained was 138 g. (yield 65%). The resulting polymer was confirmed by infrared spectrum analysis to be a copolymer of pentene-1 and butene-1.

EXAMPLE 16

300 ml. of heptane, 5.9 g. of titanium trichloride, 5.8 g. of ferric acetylacetonate and 115 ml. of triethyl aluminum mixed solution were mixed and aged at room temperature for one hour. 380 ml. of hexene-2 was then charged into this system and the reaction was carried out at a temperature of 80° C. for 28 hours. The polymer obtained was 64 g. (yield 25.2%). Ether-insoluble parts were nil.

EXAMPLE 17

The process described in Example 7 was repeated using 127 ml. of triisobutyl aluminum-heptane mixed solution (of concentration $10^{-3}$ mole/ml.) instead of triethyl aluminum mixed solution. The polymer obtained was 300 g. (yield 96%). Ether-insoluble parts were 76%. $[\eta]=1.15$.

EXAMPLE 18

320 ml. of heptane, 7.7 g. of titanium trichloride, 4.8 g. of rhodium (111) chloride and 137 ml. of triethyl aluminum mixed solution were mixed and aged at room temperature for one hour. 520 ml. of transbutene-2 was then charged into this system and the reaction was carried out at a temperature of 80° C. for 28 hours. The polymer obtained was 38 g. (yield 12%).

EXAMPLE 19

340 ml. of heptane, 3.1 g. of titanium trichloride, 7.6 g. of palladium (11) chloride and 147 ml. of triethyl aluminum mixed solution were mixed and aged at room temperature for one hour. 560 ml. of transbutene-2 was then charged into this system and the reaction was carried out at a temperature of 80° C. for 28 hours. The polymer obtained was 25 g. (yield 7%).

EXAMPLE 20

130 ml. of heptane, 3.1 g. of titanium trichloride, 1.5 g. of cobalt chloride and 55 ml. of triethyl aluminum mixed solution were mixed and aged at room temperature for one hour. 210 ml. of transbutene-2 was then charged into this system and the reaction was carried out at a temperature of 80° C. for 28 hours. The polymer obtained was 24 g. (yield 18%).

EXAMPLE 21

The process described in Example 9 was repeated, using titanium triiodide instead of titanium trichloride. The polymer obtained was 200 g. (yield 64%). Ether-insoluble parts were 7.8%. $[\eta]=1.02$.

EXAMPLE 22

The process described in Example 9 was repeated using titanium tribromide instead of titanium trichloride. Polymer obtained was 223 g. (yield 72%). Ether-insoluble parts were 34.1%. $[\eta]=1.12$.

EXAMPLE 23

The process described in Example 7 was repeated using hexane instead of heptane as solvent. The resulting polymer was 298 g. (yield 96%). Ether-insoluble parts were 80.2%. $[\eta]=1.21$.

EXAMPLE 24

Using ligroin instead of heptane as solvent under the same condition as that of Example 7, the polymerization was carried out. The resulting polymer was 287 g. (yield 92%). Ether-insoluble parts were 75.3%. $[\eta]=1.03$.

EXAMPLE 25

190 ml. of heptane, 4.6 g. of titanium trichloride, 1.5 g. of nickel dimethylglyoxime (Ni/Ti molar ratio=0.15), and 90 ml. of triethyl aluminum mixed solution were mixed and aged for an hour at room temperature. 320 ml. of cis-butene-2 was then charged into this system, followed to polymerize at 80° C. for 50 hours. The polymer obtained was 183 g. (yield 90%). Ether-insoluble parts were 76.4%. $[\eta]=1.90$.

EXAMPLE 26

120 ml. of heptane, 5.6 g. of titanium trichloride, 10.5 g. of nickel dimethylglyoxime (Ni/Ti molar ratio=1.0), 220 ml. of triethyl aluminum mixed solution were mixed and aged for one hour at room temperature. 380 ml. of cis-butene-2 was then charged into this system, followed to polymerize for 18 hours at 80° C. The polymer obtained was 126 g. (yield 52.1%). Ether-insoluble parts were 65.1%. $[\eta]=1.00$.

EXAMPLE 27

10 ml. of heptane, 6.0 g. of titanium trichloride, 5.6 g. of nickel dimethylglyoxime (Ni/Ti molar ratio=0.5), and 350 ml. of triethyl aluminum mixed solution were mixed and aged for one hour at room temperature. 410 ml. of cis-butene-2 was then charged into this system and then polymerized at 80° C. for 18 hours. The resulting polymer was 117 g. (yield 44.9%). Ether-insoluble parts were 42.2%. $[\eta]=1.90$.

EXAMPLE 28

The polymerization was carried out for 10 hours by using 14.0 g. of titanium trichloride (100 mmol/l.) under the same condition as that of Example 7. The resulting polymer was 293 g. (yield 94%). Ether-insoluble parts were 83.2%. $[\eta]=0.93$.

EXAMPLE 29

The polymerization was carried out for 24 hours by using 2.1 g. of titanium trichloride (15 mmol/l.) under the same condition as that of Example 7. The resulting polymer was 97 g. (yield 31%). Ether-insoluble parts were 68.2%. $[\eta]=1.37$.

EXAMPLE 30

The polymerization was carried out for 30 hours using n-heptene-2 instead of trans-butene-2 under the same condition as that of Example 9. The polymer obtained was 41.5 g. (yield 12%). Ether-insoluble parts were nil.

EXAMPLE 31

670 ml. of heptane, 13.3 g. of titanium trichloride, 6.2 g. of nickel dimethylglyoxime, and 259 ml. of triethyl aluminum mixed solution were mixed. This solution was aged for one hour at room temperature. 920 ml. of cis-butene-2 was then charged into this system, and polymerized for 36 hours at 100° C. The resulting polymer was 515 g. (yield 88.2%). Ether-insoluble parts were 67.4%. $[\eta]=1.10$.

EXAMPLE 32

The process described in Example 31 was repeated at 120° C. The resulting polymer was 354 g. (yield 60.8%). Ether-insoluble parts were 61.7%. $[\eta]=0.80$.

EXAMPLE 33

The copolymerization was carried out by using 150 ml. of propylene (measured at −78° C.) and 230 ml. of trans-butene-2 instead of n-pentene-2 under the same condition as that of Example 14. The resulting polymer was 132 g. (yield 61%). Ether-insoluble parts were nil. Infrared spectrum of this polymer showed that this polymer consisted of the repeating units of both propylene and butene-1.

We claim:
1. A method for preparing the corresponding terminal polyolefins which comprises polymerizing and copolymerizing internal n-olefins at polymerization temperatures of 40–120° C. for 5–30 hours, by using at least ternary catalyst systems consisting of (a) a strong reducing agent selected from the organo-metallic compounds of Group III, (b) a compound selected from the transition metal compounds of Groups IV–V, and (c) a compound selected from the transition metal compounds of Group

VIII, with their isomerization to the corresponding terminal n-olefins.

2. A method for preparing the corresponding terminal polyolefins which comprises polymerizing and copolymerizing internal n-olefins at polymerization temperatures of 40–120° C. for 5–30 hours, by using at least ternary catalyst systems consisting of (a) a strong reducing agent having the formula $AlR_1R_2R_3$ wherein $R_1$, $R_2$, and $R_3$ are hydrocarbon radicals selected from the groups consisting of alkyl radicals containing 1 to 4 carbon atoms, (b) a compound having the formula $MX_3$ wherein M is titanium (III) and/or vanadium (III), and X is a halogen radical, (c) a compound selected from the groups of ferric chloride, nickel chloride, ferric acetylacetonate, nickel acetylacetonate, cobalt (II) chloride, rhodium (III) chloride palladium (II) chloride and nickel dimethylglyoxime, with their isomerization to the corresponding terminal n-olefins.

3. A composition of catalyst for polymerization of internal n-olefins with their isomerization to the corresponding terminal n-olefins, comprising at least one strong reducing agent selected from the organo-metallic compounds of Groups III, at least one compound selected from the transition metal compounds of Groups IV–V, and at least one compound selected from the transition metal compounds of Group VIII wherein the compounds of Group VIII are used in a molar ratio of 0.1–2.0 in respect to the compounds of Groups IV–V, and wherein the concentration of the catalyst is in the range of 5–100 mmole/l. by the transition metal conversion.

4. The composition of catalyst described in claim 3, further characterized in that at least one solvent selected from ligroin, hexane, and heptane are used as solvent inactive for polymerization.

5. The composition of catalyst described in claim 3, comprising triethyl aluminum, titanium trichloride, and nickel chloride or/and nickel dimethylglyoxime.

6. The composition of catalyst described in claim 3, comprising triethyl aluminum, titanium trichloride, and ferric chloride or/and ferric acetylacetonate.

7. The composition of catalyst described in claim 3, comprising triethyl aluminum, titanium trichloride, and cobalt chloride.

8. The composition of catalyst described in claim 3, comprising triethyl aluminum, vanadium trichloride, and nickel dimethylglyoxime.

9. The composition of catalyst described in claim 3, comprising triethyl aluminum, vanadium trichloride, and ferric acetylacetonate.

10. The composition of catalyst described in claim 3, comprising triisobutyl aluminum, titanium trichloride, and ferric acetylacetonate.

11. A method according to claim 1 wherein said internal n-olefins are used in a concentration of 1–10 mol/l.

References Cited

UNITED STATES PATENTS 3,125,559   3/1964   Shokal _____ 260—93.7

FOREIGN PATENTS 1,027,758   4/1966   Great Britain.

OTHER REFERENCES

Shimtzu, Takayuki and Imoto: The Polymerization of Butene-2. Journal of Polymer Science, part B, vol. 3, No. 6, June 1965.

Symcox, R. O.: Polymers from Butene-2. Journal of Polymer Science, part B, vol. 2, No. 10, October 1964.

Chemical Abstracts, vol. 62; 2688d, Isomerization of Olefins by Ziegler Catalysts.

JOSEPH L. SCHOFER, Primary Examiner

ROGER S. BENJAMIN, Assistant Examiner

U.S. Cl. X.R.

252—429, 431; 260—88.2, 93.7, 683.2

PO-1050
(5/69)

UNITED STATES PATENT OFFICE
CERTIFICATE OF CORRECTION

Patent No. 3,489,731    Dated January 13, 1970

Inventor(s) Riichiro Imoto, Akihiko Shimizu, Takyuki Otsu & Minoru Imoto

It is certified that error appears in the above-identified patent and that said Letters Patent are hereby corrected as shown below:

The Serial No. of the application in the heading of the patent should read "Ser. No. 562,111".

SIGNED AND SEALED
APR 28 1970

(SEAL)
Attest:

Edward M. Fletcher, Jr.
Attesting Officer

WILLIAM E. SCHUYLER, JR.
Commissioner of Patents